United States Patent Office.

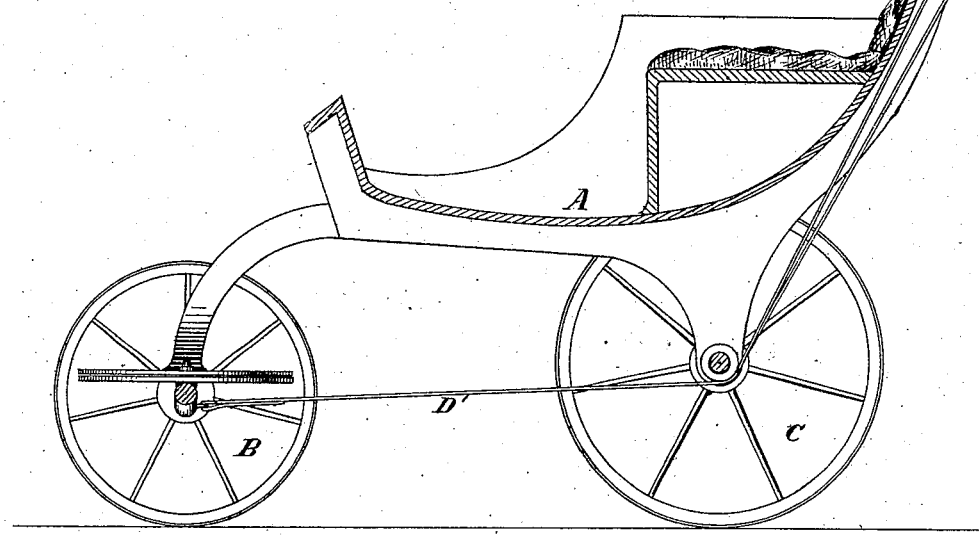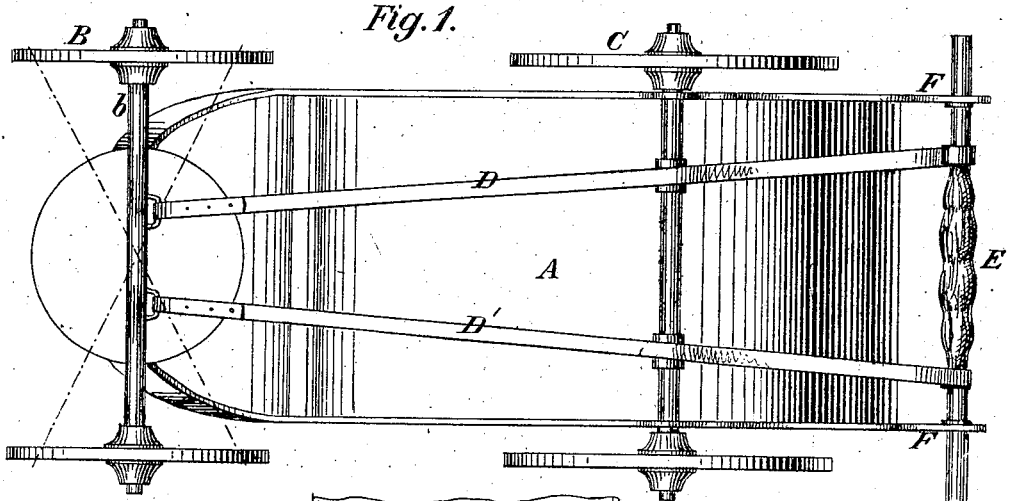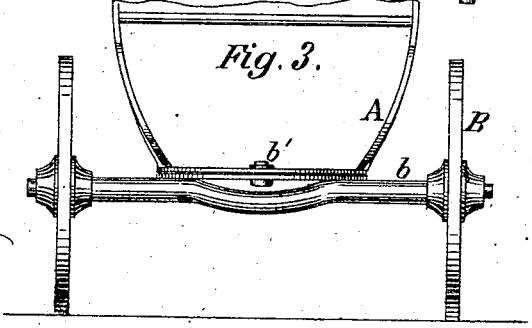

ISAAC NEWTON FORRESTER, OF BRIDGEPORT, CONNECTICUT.

Letters Patent No. 108,993, dated November 8, 1870.

IMPROVEMENT IN CHILDREN'S CARRIAGES.

The Schedule referred to in these Letters Patent and making part of the same.

*To all whom it may concern:*

Be it known that I, ISAAC NEWTON FORRESTER, of Bridgeport, in the county of Fairfield and State of Connecticut, have invented a new and useful Improvement in Children's Carriages, of which the following is a specification.

My invention relates to children's carriages of that class which is pushed from behind and has four wheels. Its object is to enable the carriage easily to be steered; and The improvement consists in combining front wheels mounted on an axle arranged to turn on a king-bolt, guiding-straps, bands, cords, or chains attached to this axle, and a turning-spool or windlass at the back of the carriage, around which the steering-bands are wound in opposite directions, so that, as the windlass is turned, one strap will be wound upon and the other unwound from it to vary the angle of the front axle to the rear one, and thus guide the carriage.

In the accompanying drawing, which shows one convenient way of applying my invention—

Figure 1 is a plan of the under side of the carriage.

Figure 2, a vertical longitudinal central section thereof.

Figure 3, a front elevation thereof.

Figure 4, a perspective view of the guiding-handles and windlass detached.

A body, A, of suitable well-known construction, is mounted on four wheels, B C.

The hind wheels are fixed, while the front ones, B, are mounted on an axle, b, turning on a king-bolt, b', in the common way.

Steering-straps D D' are attached to the axle on opposite sides of its pivot, and extend underneath the body to a windlass or spool, E, mounted in bearings in the guiding-handles F, or on a cross-bar connecting these handles.

The straps D D' are wound upon the spool in opposite directions, so that when it is turned one is wound upon and the other unwound from it.

The attendant, by this construction, is enabled to steer the carriage by merely turning the spool without ceasing to push or releasing the handle.

I have shown rollers on the rear axle, over which the straps may run to diminish friction.

It is obvious that rods, sliding endwise under the carriage, might be substituted for the straps, but the straps are cheaper.

I do not broadly claim every mode of steering a vehicle by means of cords and a windlass, as such devices are common; as, for instance, in Goodman's patent of September 13, 1864, for velocipedes, in which the rider steers by means of a windlass, the axis of which is at right angles to the axles of the wheels, the windlass being in front of the machine. Such an arrangement obviously differs from mine, as an attendant could not conveniently walk behind such a machine and steer it without reaching around the rider.

I claim as my invention—

The combination, in a child's carriage constructed to be pushed from behind, of the pivoted front axle, the guiding straps passing under the carriage, and the spool upon the pushing-handle at the back of the carriage, around which the straps are wound in opposite directions, all these parts being constructed and arranged as set forth, for joint operation.

In testimony whereof, I have hereunto subscribed my name.

I. N. FORRESTER.

Witnesses:
JOE I. PEYTON,
BALTIS DE LONG.